United States Patent
Nagatsu et al.

(10) Patent No.: US 9,546,613 B2
(45) Date of Patent: Jan. 17, 2017

(54) CONTROL DEVICE OF COMPRESSION-IGNITION ENGINE

(71) Applicant: Mazda Motor Corporation, Aki-gun, Hiroshima (JP)

(72) Inventors: Kazuhiro Nagatsu, Hiroshima (JP);
Junichi Taga, Higashihiroshima (JP);
Takashi Youso, Hiroshima (JP);
Atsushi Inoue, Aki-gun (JP);
Mitsunori Wasada, Hiroshima (JP);
Keiji Araki, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 104 days.

(21) Appl. No.: 14/464,569

(22) Filed: Aug. 20, 2014

(65) Prior Publication Data
US 2015/0083072 A1    Mar. 26, 2015

(30) Foreign Application Priority Data
Sep. 25, 2013  (JP) ................................. 2013-198269

(51) Int. Cl.
| | |
|---|---|
| *F02M 37/04* | (2006.01) |
| *F02D 41/00* | (2006.01) |
| *F02B 1/14* | (2006.01) |
| *F02D 13/02* | (2006.01) |
| *F02D 41/30* | (2006.01) |

(Continued)

(52) U.S. Cl.
CPC ............... *F02D 41/005* (2013.01); *F02B 1/10* (2013.01); *F02B 1/14* (2013.01); *F02D 13/0261* (2013.01);
(Continued)

(58) Field of Classification Search
CPC  F02D 41/005; F02D 13/0261; F02D 41/0025; F02D 41/006; F02D 41/0077; F02D 41/0057; F02D 41/0065; F02D 41/3035; F02D 41/3836; F02M 25/0738; F02M 25/12; F02B 1/10; F02B 1/14; Y02T 10/18
(Continued)

(56) References Cited

U.S. PATENT DOCUMENTS 4,206,731 A * 6/1980 Sato et al. ..................... 123/676
5,778,674 A * 7/1998 Kimura ........................... 60/600
(Continued)

FOREIGN PATENT DOCUMENTS

| JP | 2007120330 A | 5/2007 |
| JP | 2009197740 A | 9/2009 |
| JP | 2012172665 A | 9/2012 |

*Primary Examiner* — Marguerite McMahon
(74) *Attorney, Agent, or Firm* — Alleman Hall McCoy Russell & Tuttle LLP

(57) ABSTRACT

A control device of a compression-ignition engine is provided. The control device includes the engine having a cylinder, an exhaust gas recirculation system for introducing exhaust gas into the cylinder, and a controller for operating the engine by compression-ignition combustion of mixture gas inside the cylinder within a predetermined compression-ignitable range on a low engine load side. Within the compression-ignitable range, the controller sets an EGR ratio higher as the engine load becomes lower, and the controller sets the EGR ratio to a predetermined highest EGR ratio when the engine load is at a specific load that is on the low engine load side within the compression-ignitable range. When the engine load is lower than the specific load, the controller sets the EGR ratio to be lower than the highest EGR ratio.

9 Claims, 9 Drawing Sheets

(51) Int. Cl.
*F02D 41/40* (2006.01)
*F02M 25/12* (2006.01)
*F02B 1/10* (2006.01)
*F02D 41/38* (2006.01)

(52) U.S. Cl.
CPC ....... *F02D 41/0025* (2013.01); *F02D 41/0057* (2013.01); *F02D 41/0077* (2013.01); *F02D 41/3035* (2013.01); *F02D 41/401* (2013.01); *F02M 25/12* (2013.01); *F02D 41/006* (2013.01); *F02D 41/0065* (2013.01); *F02D 41/3836* (2013.01); *F02M 26/33* (2016.02); *Y02T 10/128* (2013.01); *Y02T 10/18* (2013.01); *Y02T 10/44* (2013.01); *Y02T 10/47* (2013.01)

(58) Field of Classification Search
USPC ........................................ 123/568.11, 568.13
See application file for complete search history.

(56) References Cited

U.S. PATENT DOCUMENTS

| | | | | |
|---|---|---|---|---|
| 5,908,022 | A * | 6/1999 | Aoki et al. | 123/568.16 |
| 6,161,519 | A * | 12/2000 | Kimura et al. | 123/299 |
| 2012/0216776 | A1* | 8/2012 | Nagatsu et al. | 123/305 |
| 2012/0330534 | A1* | 12/2012 | Cleeves et al. | 701/104 |
| 2014/0060493 | A1* | 3/2014 | Iwai et al. | 123/478 |
| 2014/0144414 | A1* | 5/2014 | Dean | F02D 41/006 123/568.14 |
| 2015/0083073 | A1* | 3/2015 | Nagatsu et al. | 123/294 |
| 2015/0114342 | A1* | 4/2015 | Iwai et al. | 123/305 |

* cited by examiner

CONTROL DEVICE OF COMPRESSION-IGNITION ENGINE

BACKGROUND

The present invention relates to a control device of a compression-ignition engine.

For example, JP2009-197740A discloses an engine which performs compression-ignition combustion of mixture gas inside a cylinder when an operating state of the engine is within a predetermined range on a low engine speed side and on a low engine load side. In the engine, for performing the compression-ignition combustion, a close timing of an exhaust valve is set to before a (compression) top dead center and an open timing of an intake valve is set to after the top dead center to provide a period in which the exhaust and intake valves are both closed over the top dead center (i.e., negative overlap period). By providing the negative overlap period, a part of high-temperature exhaust gas remains within the cylinder. In other words, a temperature inside the cylinder is increased by an internal EGR (Exhaust Gas Recirculation), and thus, ignitability in the compression ignition and combustion stability improve. JP2009-197740A also discloses that within an operating range of the engine where the compression-ignition combustion is performed, an EGR ratio by the internal EGR is increased by advancing the close timing of the exhaust valve more as the engine load becomes lower.

Moreover, JP2007-120330A discloses an engine for a gas heat pump in which, similarly to JP2009-197740A, the EGR ratio by the internal EGR is increased when performing the compression-ignition combustion, by extending the negative overlap period longer as the engine load becomes lower.

Generally, as the engine load becomes lower, a temperature environment inside a cylinder degrades, and thus, it is disadvantageous when performing compression-ignition combustion. Therefore, increasing the EGR ratio by the internal EGR more as the engine load becomes lower as disclosed in JP2009-197740A and JP2007-120330A increases the temperature inside the cylinder when the piston reaches the compression top dead center (i.e., a compression-end temperature) since an amount of the exhaust gas introduced in to the cylinder is increased and the temperature inside the cylinder before compression stroke starts is increased. Thus, the increase in the EGR ratio described above can be advantageous in view of the ignitability in the compression ignition and the combustion stability.

However, through the study by the present inventors, it was discovered that setting the EGR ratio higher than a predetermined ratio would result in decreasing the compression-end temperature. This degrades the ignitability in the compression ignition and the combustion stability when the engine operating state is within a range where the engine load is low or extremely low.

SUMMARY

The present invention is made in view of the above situations and aims to improve ignitability in compression ignition and combustion stability of a compression-ignition engine when an operating state of the engine is within a low engine load range.

Exhaust gas contains a large amount of $CO_2$ and $H_2O$ which are triatomic molecules, and it has a high specific heat ratio compared to air containing nitrogen ($N_2$) and oxygen ($O_2$) (i.e., fresh air introduced into a cylinder). Therefore, when a ratio of the exhaust gas introduced into the cylinder is increased by increasing an EGR ratio, although a gas temperature inside the cylinder before compression stroke starts may increase, the gas temperature does not increase much even after the compression stroke starts, and as a result, a compression-end temperature becomes low. In the present invention, within a low engine load range where compression-ignition combustion is performed (compression ignition range), basically ignitability in compression ignition and combustion stability are secured by setting the EGR ratio higher as the engine load becomes lower, whereas when the engine load is lower than a specific load on the low engine load side of the compression ignition range, by setting the EGR ratio lower than a predetermined highest EGR ratio, the decrease in the compression-end temperature is avoided and the ignitability in the compression ignition and the combustion stability are improved.

Specifically, according to one aspect to the present invention, a control device of a compression-ignition engine is provided. The control device includes the engine having a cylinder, an exhaust gas recirculation system for introducing exhaust gas into the cylinder, and a controller for operating the engine by compression-ignition combustion of mixture gas inside the cylinder when an operating state of the engine is within a predetermined compression-ignitable range on a low engine load side.

When the operating state of the engine is within the compression-ignitable range, the controller sets an EGR ratio higher as the engine load becomes lower, and the controller sets the EGR ratio to a predetermined highest EGR ratio when the engine load is at a specific load that is on the low engine load side within the compression-ignitable range, the EGR ratio being a ratio of the exhaust gas with respect to a total gas amount within the cylinder. When the engine load is lower than the specific load, the controller sets the EGR ratio to be lower than the highest EGR ratio.

Here, the phrase "the specific load that is on the low engine load side within the compression-ignitable range" can be defined as a predetermined load set on the low engine load side when the compression-ignitable range is divided into two ranges of the low engine load side and the high engine load side in the engine load direction.

According to the above configuration, within the low engine load part of the range where the compression-ignition combustion is performed, the EGR ratio is set higher as the engine load becomes lower. Although the temperature inside the cylinder becomes lower as the engine load becomes lower, by setting the EGR ratio high to increase a ratio of the high-temperature exhaust gas introduced into the cylinder, a compression-start temperature and a compression-end temperature increase. Then, within the compression-ignitable range, ignitibility in the compression ignition and combustion stability can be secured. Note that the EGR ratio may be set to be high continuously or in a stepwise fashion despite the decrease in the engine load; however, in view of the stability of the compression-ignition combustion and controllability in a state and amount control relating to the adjustment of the EGR ratio, it is preferable to set the EGR ratio high continuously despite the decrease in the engine load.

The EGR ratio is set the highest when the engine load is at the specific load. Further, when the engine load is lower than the specific load, the EGR ratio is set lower than the highest EGR ratio.

Here, when the engine load is lower than the specific load, instead of setting the EGR ratio to be lower than the highest EGR ratio, it may be set to the highest EGR ratio (in other words, regardless of the engine load, the EGR ratio is fixed at the highest EGR ratio).

Moreover, differently from this, when the engine load is lower than the specific load, the EGR ratio may be set lower as the engine load becomes lower.

Thus, since controlling the EGR ratio leads to controlling the amount of the exhaust gas introduced into the cylinder, a specific heat ratio of the entire gas introduced into the cylinder (in other words, gas containing fresh air and the exhaust gas) can be avoided from becoming excessively low. As a result, a decrease in the compression-end temperature can be suppressed while keeping the gas temperature inside the cylinder before compression stroke starts comparatively high. Specifically, since the compression-end temperature can be kept comparatively high, the ignitability in the compression ignition and the combustion stability can be improved when the engine load is low.

Here, the highest EGR ratio may be set to be between 50% and 90%. Specifically, the highest EGR ratio may be set as high as possible within the extent that a high compression-end temperature at which the ignitability in the compression ignition and the combustion stability can be secured can be obtained. Thus, although an unburned fuel loss easily becomes high particularly when the engine load is low, by setting the EGR ratio as high as possible to introduce a largest-possible amount of the exhaust gas into the cylinder, the unburned fuel loss can be reduced, which is advantageous for improving fuel consumption.

Moreover, as described later, with a configuration in which ozone is introduced into the cylinder by an ozone introducer when the engine load is lower than the specific load, since the ignitability in the compression ignition and the combustion stability are improved by the introduction of ozone, the highest EGR ratio may be set lower. Particularly, in configurations of engines, for example, with a configuration in which a geometric compression ratio is set comparatively low and the compression-end temperature becomes comparatively low, it becomes necessary to introduce more ozone into the cylinder to secure the ignitability in the compression ignition and the combustion stability when the engine load is lower than the specific load. Therefore, with the engine of which the geometric compression ratio is set comparatively low, the highest EGR ratio may be set lower.

The exhaust gas recirculation system may include an internal EGR system for recirculating the exhaust gas back into the cylinder by open-and-close controls of an intake valve and an exhaust valve of the engine. The internal EGR system may adjust the EGR ratio when the operating state of the engine is within the compression-ignitable range.

Compared to an external EGR system for recirculating exhaust gas via an EGR passage provided outside the engine, the internal EGR system can introduce the exhaust gas into the cylinder while keeping its temperature high. This increases the gas temperature at the start of the compression stroke and the compression-end temperature, which is advantageous for stabilizing the compression-ignition combustion.

The internal EGR system may introduce the exhaust gas that is discharged to the exhaust side on an exhaust stroke, into the cylinder by opening the exhaust valve on an intake stroke.

Specifically, the internal EGR system may be configured to provide, by closing the exhaust valve before an exhaust top dead center and opening the intake valve after the exhaust top dead center (intake top dead center), a negative overlap period in which the intake and exhaust valves are both closed over the top dead center. However, with this configuration, since the high-temperature exhaust gas trapped within the cylinder is compressed due to the exhaust valve being closed on the exhaust stroke, the cooling loss increases. This causes inconvenience in that the gas temperature at the start of the compression stroke decreases, and as a result, the compression-end temperature decreases.

Moreover, the internal EGR system may discharge a part of the exhaust gas to an intake port by opening the intake valve on the exhaust stroke and also introduce the exhaust gas into the cylinder again along with fresh air on the intake stroke (so-called intake open-twice control). With this configuration, the negative overlap period is not provided, the high-temperature exhaust gas is not compressed, and the cooling loss is reduced. However, since the temperature of the intake port is lower than that of an exhaust port, the temperature of the exhaust gas easily decreases while being discharged to the intake port. This causes inconvenience in that the gas temperature at the start of the compression stroke decreases, and as a result, the compression-end temperature decreases.

Whereas, a configuration in which the exhaust valve is opened on the intake stroke and a part of the exhaust gas discharged on the exhaust stroke is introduced into the cylinder (so-called exhaust open-twice control), can reduce the cooling loss similarly to the intake open-twice control, and moreover, it can suppress the temperature decrease in the exhaust gas discharged to the exhaust port, as opposed to the intake open-twice control, since the temperature of the exhaust port is higher than that of the intake port. As a result, the exhaust open-twice control can suppress the decrease in the gas temperature at the start of the compression stroke more, and is more effective at improving the ignitability in the compression ignition and the combustion stability by increasing the compression-end temperature.

The control device of the compression-ignition engine may also include an ozone introducer for introducing ozone into the cylinder. When the engine load is lower than the specific load, the controller may introduce ozone into the cylinder by the ozone introducer.

By introducing ozone into the cylinder, the ignitability in the compression ignition is improved, as well as the stability of the compression-ignition combustion. As described above, by setting the EGR ratio lower than the highest EGR ratio when the engine load is lower than the specific load, the compression-end temperature is close to a highest temperature that can be obtained in the engine, and it is difficult to obtain a compression-end temperature higher than that. Thus, by introducing ozone into the cylinder instead of adjusting the compression-end temperature, the ignitability in the compression ignition and the combustion stability can be secured.

The introduction of ozone into the cylinder may be performed, for example, only when the compression-end temperature is relatively low as a result of the gas temperature at the start of the compression stroke becoming low due to an ambient temperature being low or extremely low. Alternatively, as described above, the introduction of ozone into the cylinder may be performed only when the compression-end temperature becomes low due to various factors, such as the compression ratio (including the geometric compression ratio and an effective compression ratio) being comparatively low.

Note that the introduction of ozone into the cylinder may be performed such that ozone is applied to intake air when the intake air is introduced into the cylinder, or alternatively, ozone may be applied to gas inside the cylinder after the intake air is introduced into the cylinder.

DETAILED DESCRIPTION OF EMBODIMENT

Figure 1:
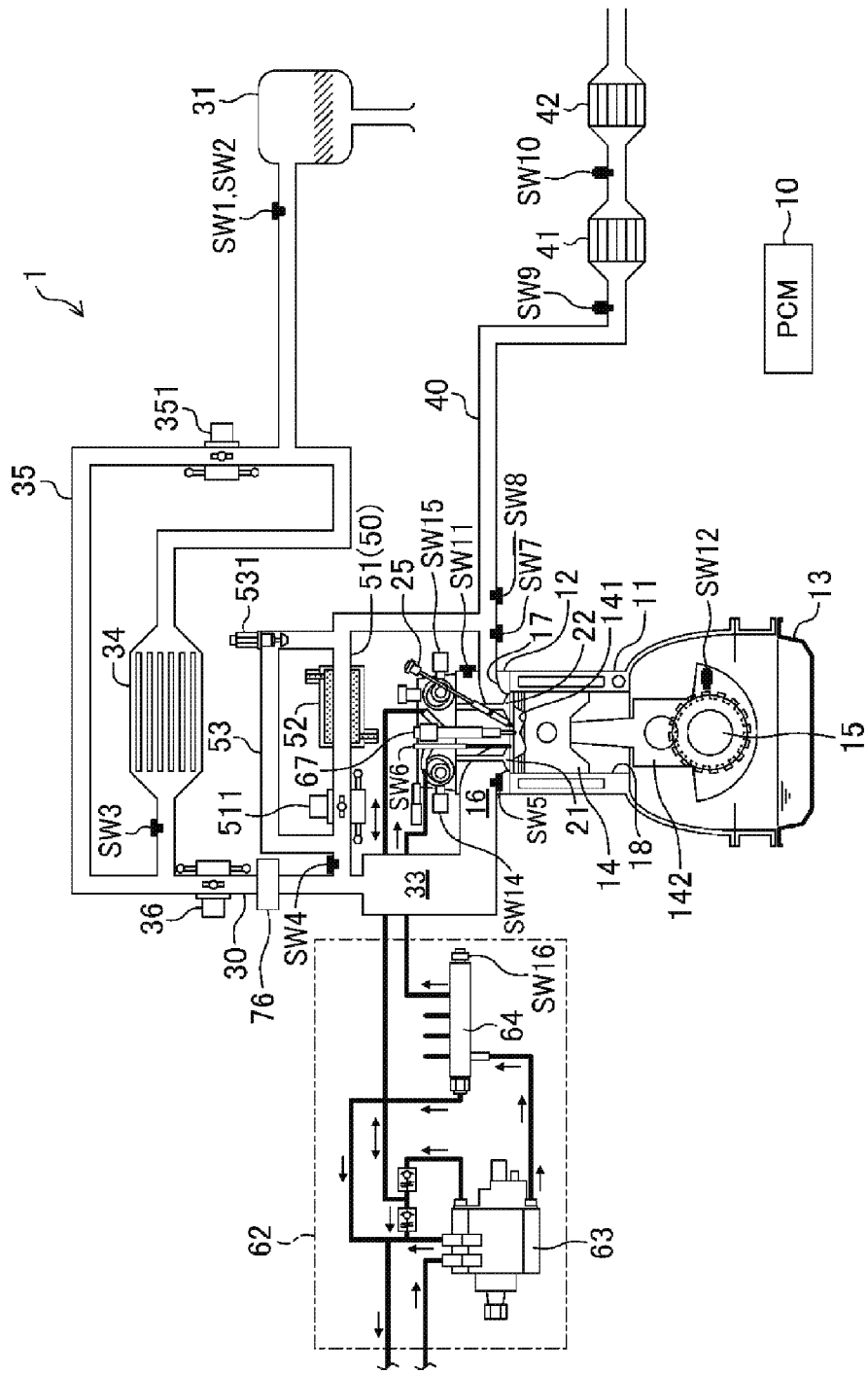
FIG. 1 is a schematic diagram illustrating a configuration of a compression-ignition engine.
Figure 2:
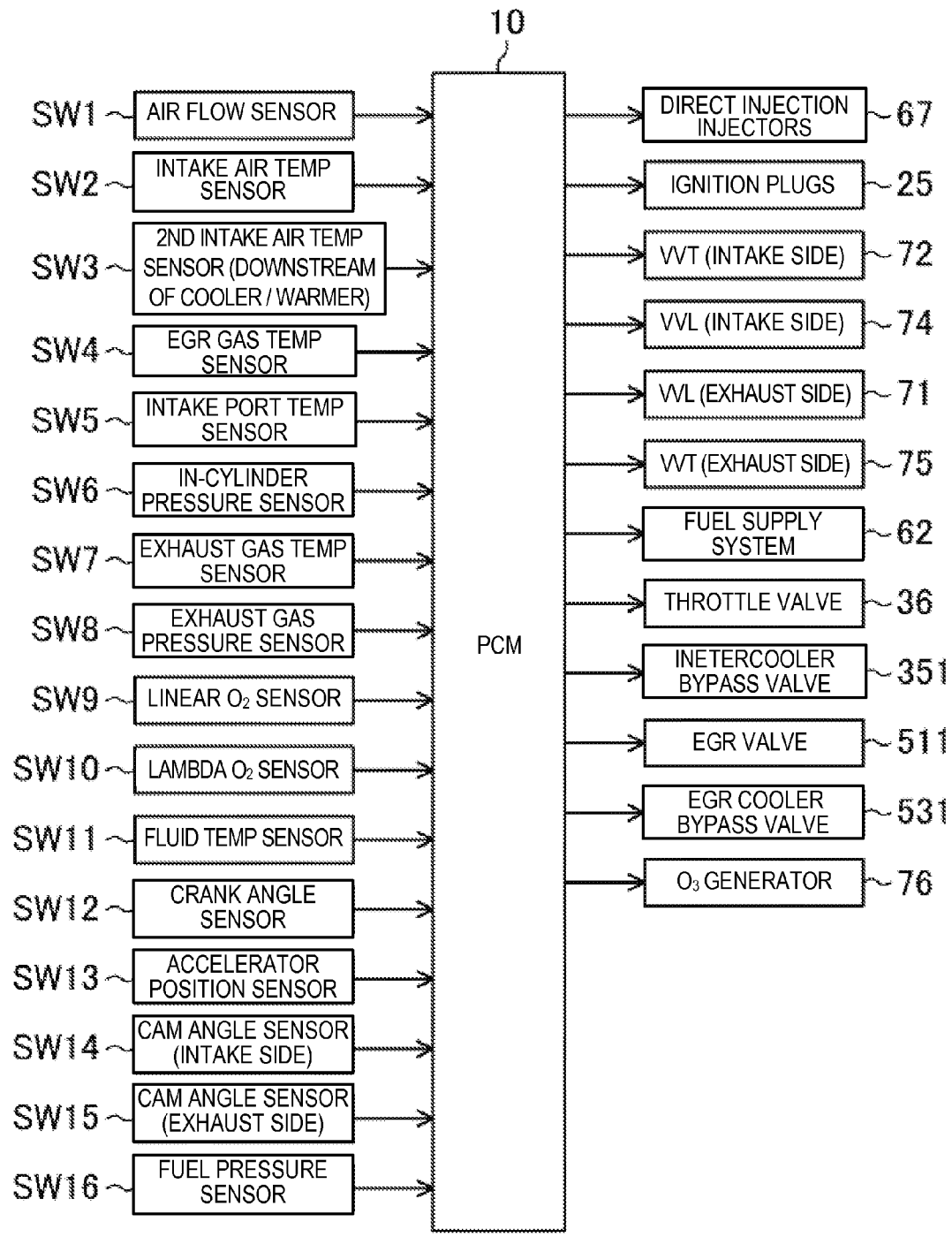
FIG. 2 is a block diagram relating to a control of the compression-ignition engine.
Figure 3:
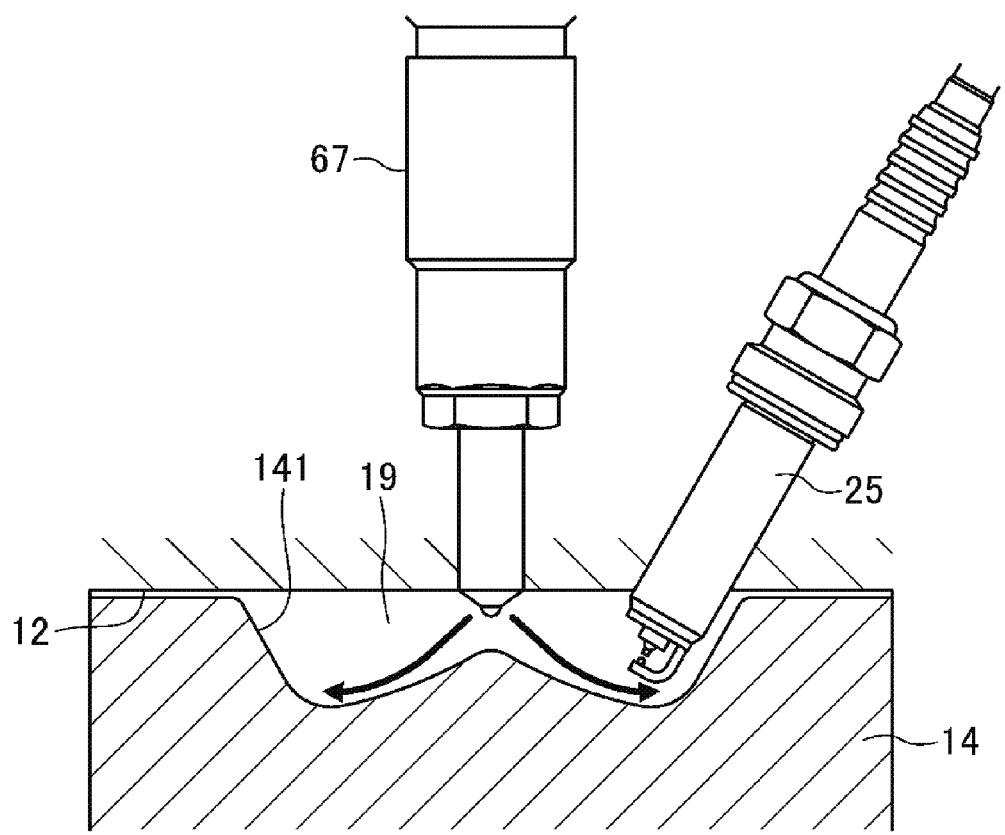
FIG. 3 is a cross-sectional view illustrating a combustion chamber in an enlarged manner.

Hereinafter, a control device of a compression-ignition engine according to one embodiment of the present invention is described in detail with reference to the appended drawings. The following description of the preferred embodiment is an illustration. FIGS. 1 and 2 illustrate a schematic configuration of an engine 1 (main body of the engine) of this embodiment. The engine 1 is a compression-ignition gasoline engine that is equipped in a vehicle and supplied with fuel containing at least gasoline. The engine 1 includes a cylinder block 11 provided with a plurality of cylinders 18 (note that although only one cylinder is illustrated in FIG. 1, for example, four cylinders are linearly provided in this embodiment), a cylinder head 12 disposed on the cylinder block 11, and an oil pan 13 disposed below the cylinder block 11, where a lubricant is stored. Reciprocatable pistons 14 coupled to a crankshaft 15 via respective connecting rods 142 are fitted inside the cylinders 18. As illustrated in FIG. 3 in an enlarged manner, a cavity 141 having a reentrant shape, such as the shape generally used in a diesel engine, is formed on a top face of each piston 14. When the piston 14 is at a position near a compression top dead center (CTDC), the cavity 141 faces toward an injector 67 described later. The cylinder head 12, the cylinders 18, and the pistons 14 each formed with the cavity 141 partition combustion chambers 19. Note that the shape of the combustion chamber 19 is not limited to the shape in the drawings. For example, the shape of the cavity 141, the shape of the top face of the piston 14, and the shape of a ceiling part of the combustion chamber 19 may suitably be changed.

A geometric compression ratio of the engine 1 is set comparatively high at 15:1 or higher so as to improve theoretical thermal efficiency and stabilize compression-ignition combustion (described later). Note that the geometric compression ratio may suitably be set within a range between about 15:1 and 20:1.

In the cylinder head 12, each of the cylinders 18 is formed with an intake port 16 and an exhaust port 17, and provided with an intake valve 21 for opening and closing the intake port 16 on the combustion chamber 19 side and an exhaust valve 22 for opening and closing the exhaust port 17 on the combustion chamber 19 side.

Figure 5:
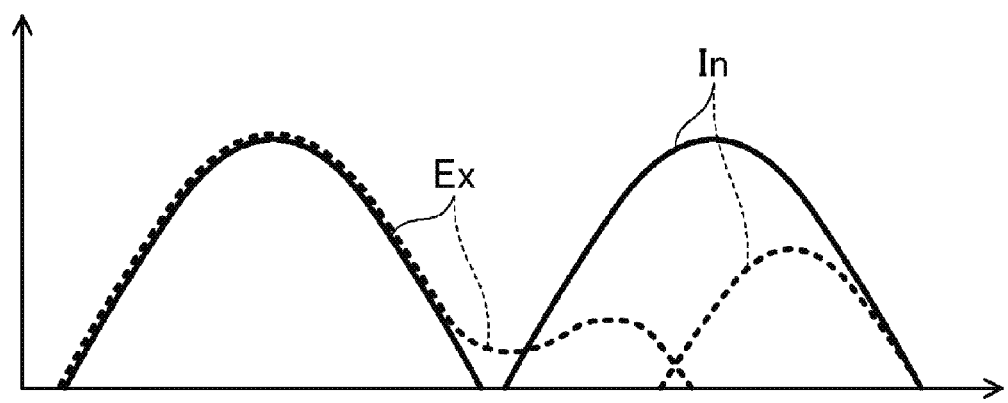
FIG. 5 illustrates a lift curve of an intake valve switchable between a large lift and a small lift, and a lift curve of an exhaust valve switchable between a normal open operation and a special operation in which the valve opens again on intake stroke.

In a valve train system of the engine 1 for operating the intake and exhaust valves 21 and 22, for example, a hydraulically-actuated variable valve mechanism 71 (see FIG. 2, hereinafter, may be referred to as the VVL (Variable Valve Lift)) for switching an operation mode of the exhaust valve 22 between a normal mode and a special mode, and a phase variable mechanism 75 (hereinafter, may be referred as the VVT (Variable Valve Timing)) for changing a rotational phase of an exhaust camshaft with respect to the crankshaft 15, are provided on an exhaust side. The VVL 71 (the detailed configuration is not illustrated) includes two kinds of cams with different cam profiles in which a first cam has one cam nose and a second cam has two cam noses; and a lost motion mechanism for selectively transmitting an operating state of either one of the first and second cams to the exhaust valve 22. While the lost motion mechanism transmits the operating state of the first cam to the exhaust valve 22, as indicated by the solid line in FIG. 5, the exhaust valve 22 operates in the normal mode where it opens only once during exhaust stroke. On the other hand, while the lost motion mechanism transmits the operating state of the second cam to the exhaust valve 22, as indicated by the dashed line in FIG. 5, the exhaust valve 22 operates in the special mode, which is a so-called exhaust open-twice control, where it opens once during the exhaust stroke and once more during an intake stroke. The normal and special modes of the VVL 71 are switched therebetween according to an operating state of the engine. Specifically, the special mode is utilized for a control related to an internal EGR. Hereinafter, the processing of operating the VVL 71 in the normal mode where the exhaust open-twice control is not performed may be referred to as "turning the VVL 71 off," and the processing of operating the VVL 71 in the special mode where the exhaust open-twice control is performed may be referred to as "turning the VVL 71 on." Note that in enabling the switch between the normal mode and the special mode, an electromagnetic valve train system for operating the exhaust valve 22 by an electromagnetic actuator may be adopted.

Note that the execution of the internal EGR is not limited to be achieved by the exhaust open-twice control only. For example, the internal EGR control may be performed by an intake open-twice control in which the intake valve 21 opens twice, and an internal EGR control may be performed in which burned gas remains inside the cylinder 18 by providing a negative overlap period in which both the intake and exhaust valves 21 and 22 are closed on the exhaust stroke or the intake stroke. Note that as described later, the exhaust open-twice control is most preferable for increasing the compression-end temperature.

For the VVT 75, a known structure of any one of a hydraulic type, an electromagnetic type, and a mechanical type may suitably be adopted, and detailed structure thereof is not illustrated. Open and close timings of the exhaust valve 22 can be changed continuously by the VVT 75 within a predetermined range.

Similarly to the exhaust side of the valve train system including the VVL 71 and the VVT 75, an intake side of the valve train system includes a VVL 74 and a VVT 72 as illustrated in FIG. 2. The VVL 74 on the intake side is different from the VVL 71 on the exhaust side. The VVL 74 on the intake side includes two kinds of cams with different cam profiles in which a large lift cam relatively increases the lift of the intake valve 21 and a small lift cam relatively reduces the lift of the intake valve 21; and a lost motion mechanism for selectively transmitting an operating state of either one of the large and small lift cams to the intake valve 21. While the VVL 74 transmits the operating state of the large lift cam to the intake valve 21, as indicated by the solid line in FIG. 5, the intake valve 21 opens with a relatively large lift, and an open period thereof is long. On the other hand, while the VVL 74 transmits the operating state of the small lift cam to the intake valve 21, as indicated by the dashed line in FIG. 5, the intake valve 21 opens with a relatively small lift, and the open period thereof is short. The large lift cam and the small lift cam are set to be switched while keeping the close and open timings the same.

Also for the VVT 72 on the intake side, similarly to the VVT 75 on the exhaust side, a known structure of any one of a hydraulic type, an electromagnetic type, and a mechanical type may suitably be adopted, and detailed structure thereof is not illustrated. Open and close timings of the intake valve 21 can also be changed continuously by the VVT 72 within a predetermined range.

For each cylinder 18, the (direct injection) injector 67 for directly injecting the fuel into the cylinder 18 is attached to the cylinder head 12. As illustrated in an enlarged manner in FIG. 3, a nozzle hole of the injector 67 is arranged in a center portion of the ceiling face of the combustion chamber 19 to be oriented toward the inside of the combustion chamber 19. The injector 67 directly injects the fuel into the combustion chamber 19 by an amount according to the operating state of the engine 1 at an injection timing set according to the operating state of the engine 1. In this embodiment, the injector 67 (a detailed configuration is not illustrated) is a multi-hole injector formed with a plurality of nozzle holes. Thus, the injector 67 injects the fuel so that the fuel spray spreads radially from the center portion of the combustion chamber 19. As indicated by the arrows in FIG. 3, at a timing when the piston 14 reaches near the CTDC, the fuel spray injected to spread radially from the center portion of the combustion chamber 19 flows along a wall surface of the cavity 141 formed on the piston top face. Therefore, it may be said that the cavity 141 is formed to contain therewithin the fuel spray injected at the timing when the piston 14 reaches near the CTDC. The combination of the multi-hole injector 67 and the cavity 141 is advantageous for, after the fuel is injected, shortening a mixture gas forming period and the combustion period. Note that the injector 67 is not limited to the multi-hole injector, and may be an outward opening valve type injector.

A fuel supply path couples a fuel tank (not illustrated) to the injectors 67. A fuel supply system 62 for supplying the fuel to each of the injectors 67 at a comparatively high fuel pressure and having a fuel pump 63 and a common rail 64 is provided within the fuel supply path. The fuel pump 63 pumps the fuel from the fuel tank to the common rail 64, and the common rail 64 can accumulate the pumped fuel at a comparatively high fuel pressure. By opening the nozzle holes of the injector 67, the fuel accumulated in the common rail 64 is injected from the nozzle holes of the injector 67. Here, the fuel pump 63 is a plunger type pump (not illustrated) and is operated by the engine 1. The fuel supply system 62 including the engine-operated pump enables the supply of the fuel to the injector 67 at a high fuel pressure of 30 MPa or higher. The fuel pressure may be set to about 120 MPa at the highest. As described later, the pressure of the fuel supplied to the injector 67 is changed according to the operating state of the engine 1. Note that the fuel supply system 62 is not limited to the above configuration.

Further, as illustrated in FIG. 3, an ignition plug 25 for forcibly igniting mixture gas inside the combustion chamber 19 is attached to the cylinder head 12 for each cylinder 18. In this embodiment, the ignition plug 25 is arranged penetrating the cylinder head 12 so as to extend obliquely downward from the exhaust side of the engine 1. As illustrated in FIG. 3, a tip of the ignition plug 25 is oriented toward the inside of the cavity 141 of the piston 14 at the CTDC.

On one side surface of the engine 1, as illustrated in FIG. 1, an intake passage 30 is connected to communicate with the intake port 16 of each cylinder 18. On the other side surface of the engine 1, an exhaust passage 40 is connected to guide out the burned gas (exhaust gas) discharged from each of the combustion chambers 19 of the cylinders 18.

An air cleaner 31 for filtrating intake air is disposed in an upstream end part of the intake passage 30. A surge tank 33 is disposed near a downstream end of the intake passage 30. A part of the intake passage 30 downstream of the surge tank 33 is branched to be independent passages extending toward the respective cylinders 18, and downstream ends of the independent passages are connected with the intake ports 16 of the cylinders 18, respectively.

A water-cooled type intercooler/warmer 34 for cooling or heating air and a throttle valve 36 for adjusting an intake air amount to each cylinder 18 are disposed between the air cleaner 31 and the surge tank 33 in the intake passage 30. Moreover, an intercooler bypass passage 35 for bypassing the intercooler/warmer 34 is connected to the intake passage 30, and an intercooler bypass valve 351 for adjusting an air flow rate passing through the passage 35 is disposed within the intercooler bypass passage 35. A ratio of a flow rate within the intercooler bypass passage 35 with a flow rate within the intercooler/warmer 34 is adjusted through controlling an opening of the intercooler bypass valve 351, and thus, a temperature of fresh air introduced into the cylinder 18 can be adjusted. Note that the intercooler/warmer 34 and the members in connection therewith may be omitted.

An upstream part of the exhaust passage 40 includes an exhaust manifold. The exhaust manifold has independent passages branched toward the respective cylinders 18 and connected with respective external ends of the exhaust ports 17, and a manifold section where the independent passages merge together. In a part of the exhaust passage 40 on the downstream side of the exhaust manifold, a direct catalyst 41 and an underfoot catalyst 42 are connected as an exhaust emission control system for purifying hazardous components contained in the exhaust gas. Each of the direct catalyst 41 and the underfoot catalyst 42 includes a cylindrical case and, for example, a three-way catalyst disposed in a flow path within the case.

A part of the intake passage 30 between the surge tank 33 and the throttle valve 36 is connected with a part of the exhaust passage 40 on the upstream side of the direct catalyst 41 via an EGR passage 50 for circulating a part of the exhaust gas back to the intake passage 30. The EGR passage 50 includes a main passage 51 provided with an EGR cooler 52 for cooling the exhaust gas by an engine coolant, and an EGR cooler bypass passage 53 for bypassing the EGR cooler 52. An EGR valve 511 for adjusting a circulation amount of the exhaust gas to the intake passage 30 is disposed within the main passage 51. An EGR cooler bypass valve 531 for adjusting a flow rate of the exhaust gas flowing through the EGR cooler bypass passage 53 is disposed within the EGR cooler bypass passage 53.

Figure 4:
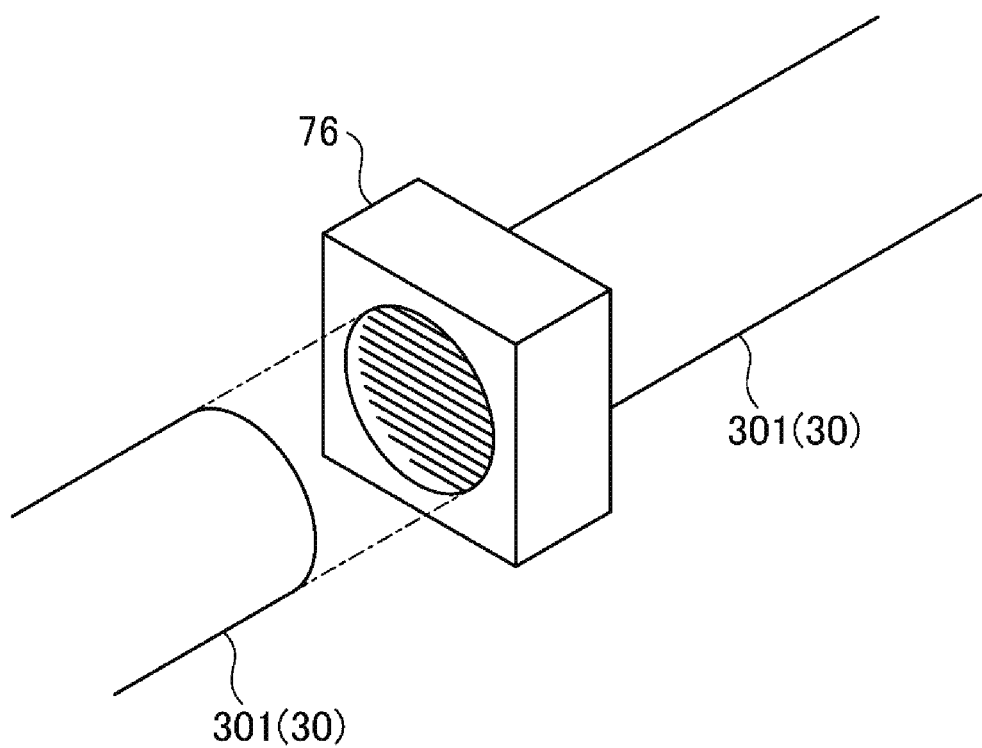
FIG. 4 is a conceptual view illustrating a configuration of an ozone generator.

Moreover, an ozone generator ($O_3$ generator) 76 for applying ozone to fresh air to be introduced into the cylinder 18 is provided in the intake passage 30 between the throttle valve 36 and the surge tank 33. For example, as illustrated in FIG. 4, the ozone generator 76 is provided to include a plurality of electrodes arranged in parallel to each other at a predetermined interval in either one of up-and-down directions and left-and-right directions in a cross section of an intake tube 301. The ozone generator 76 generates ozone by a silent discharge, using oxygen, which is contained in the intake air, as material gas. In other words, by applying a high-frequency alternating current high voltage from a power source (not illustrated) to the electrodes, silent discharge occurs in a spark gap and air passing therethrough (i.e., intake air) is ozonized. The intake air with ozone applied as above flows from the surge tank 33 to be introduced into each cylinder 18 via an intake manifold. By changing a mode of applying the voltage to the electrodes of the ozone generator 76 and/or changing the number of the electrodes to which the voltage is applied, an ozone concentration within the intake air after passing through the ozone generator 76 can be adjusted. As described later, a PCM 10 adjusts the ozone concentration within the intake air to be introduced into the cylinders 18, through such a control of the ozone generator 76.

The engine 1 with the configuration described as above is controlled by a powertrain control module 10 (hereinafter, may be referred to as the PCM). The PCM 10 is comprised of a microprocessor including a CPU, a memory, a counter timer group, an interface, and paths for connecting these units. The PCM 10 configures the controller.

As illustrated in FIGS. 1 and 2, detection signals of various kinds of sensors SW1 to SW16 are inputted to the PCM 10. The various kinds of sensors include the following sensors: an air flow sensor SW1 for detecting the flow rate of the fresh air and an intake air temperature sensor SW2 for detecting the temperature of the fresh air that are arranged on the downstream side of the air cleaner 31; a second intake air temperature sensor SW3, arranged on the downstream side of the intercooler/warmer 34, for detecting the temperature of the fresh air after passing through the intercooler/warmer 34; an EGR gas temperature sensor SW4, arranged near a connecting part of the EGR passage 50 with the intake passage 30, for detecting a temperature of external EGR gas; an intake port temperature sensor SW5, attached to the intake port 16, for detecting the temperature of the intake air immediately before flowing into the cylinder 18; an in-cylinder pressure sensor SW6, attached to the cylinder head 12, for detecting the pressure inside the cylinder 18; an exhaust gas temperature sensor SW7 and an exhaust gas pressure sensor SW8, arranged near a connecting part of the exhaust passage 40 with the EGR passage 50, for detecting the exhaust gas temperature and pressure, respectively; a linear $O_2$ sensor SW9, arranged on the upstream side of the direct catalyst 41, for detecting an oxygen concentration within the exhaust gas; a lambda $O_2$ sensor SW10, arranged between the direct catalyst 41 and the underfoot catalyst 42, for detecting the oxygen concentration within the exhaust gas; a fluid temperature sensor SW11 for detecting a temperature of the engine coolant; a crank angle sensor SW12 for detecting a rotational angle of the crankshaft 15; an accelerator position sensor SW13 for detecting an accelerator opening corresponding to an angle of an acceleration pedal (not illustrated) of the vehicle; an intake cam angle sensor SW14 and an exhaust cam angle sensor SW15; and a fuel pressure sensor SW16, attached to the common rail 64 of the fuel supply system 62, for detecting the fuel pressure supplied to the injector 67.

By performing various kinds of operations based on these detection signals, the PCM 10 determines the state of the engine 1 and further the vehicle, and outputs control signals to the injectors 67, the ignition plugs 25, the VVT 72 and the VVL 74 on the intake side, the VVT 75 and the VVL 71 on the exhaust side, the fuel supply system 62, the actuators of the various kinds of valves (the throttle valve 36, the intercooler bypass valve 351, the EGR valve 511, and the EGR cooler bypass valve 531), and the ozone generator 76 according to the determined state. In this manner, the PCM 10 operates the engine 1.

Figure 6:
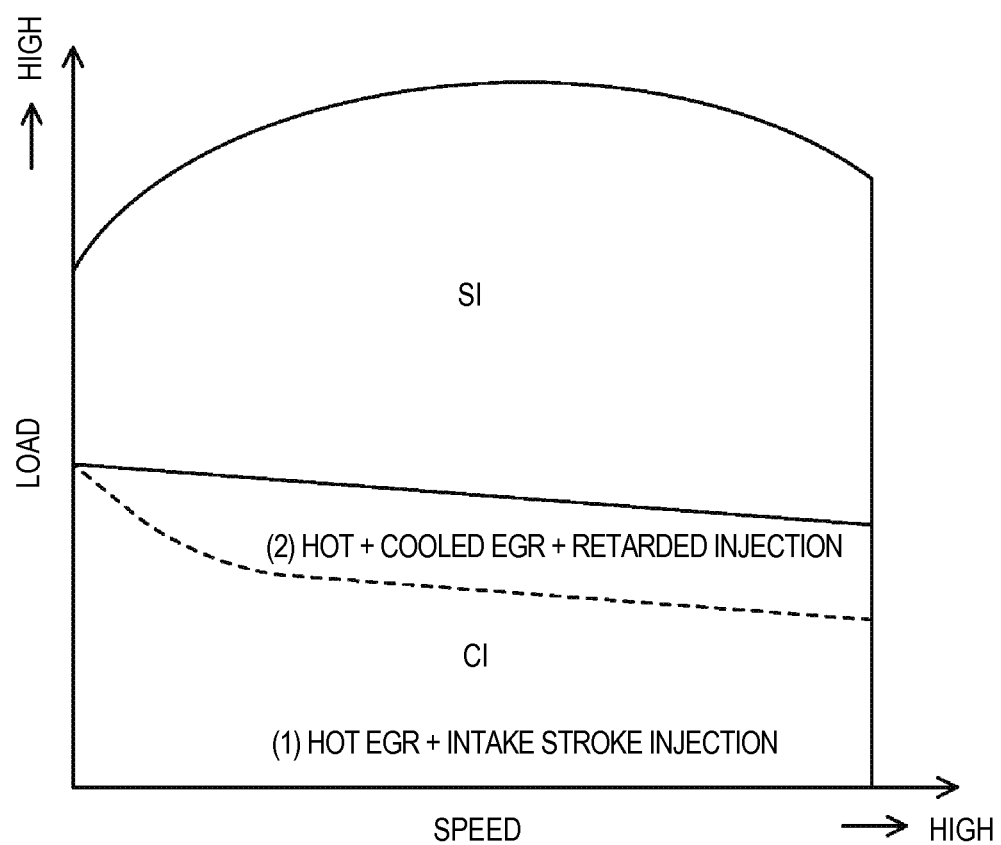
FIG. 6 is an illustration of an engine operation control map.

FIG. 6 illustrates one example of an operation control map of the engine 1. Within a low engine load range where the engine load is relatively low, the engine 1 performs compression-ignition combustion in which combustion is generated from a compression self-ignition without performing an ignition by the ignition plug 25, so as to improve fuel consumption and exhaust emission performance. However, with the compression-ignition combustion, the speed of the combustion becomes excessively rapid as the engine load increases, causing a problem of combustion noises, etc. Therefore, with the engine 1, within a high engine load range where the engine load is relatively high, the compression-ignition combustion is suspended and switched to a forced ignition combustion using the ignition plug 25 (here, spark-ignition combustion). As described above, the engine 1 is configured to switch a combustion mode according to the operating state of the engine 1, particularly according to the load of the engine 1, between a CI (Compression-Ignition) mode where the compression-ignition combustion is performed and an SI (Spark-Ignition) mode where the spark-ignition combustion is performed. Note that the boundary of switching the mode is not limited to the example in the illustration.

Figure 7A:
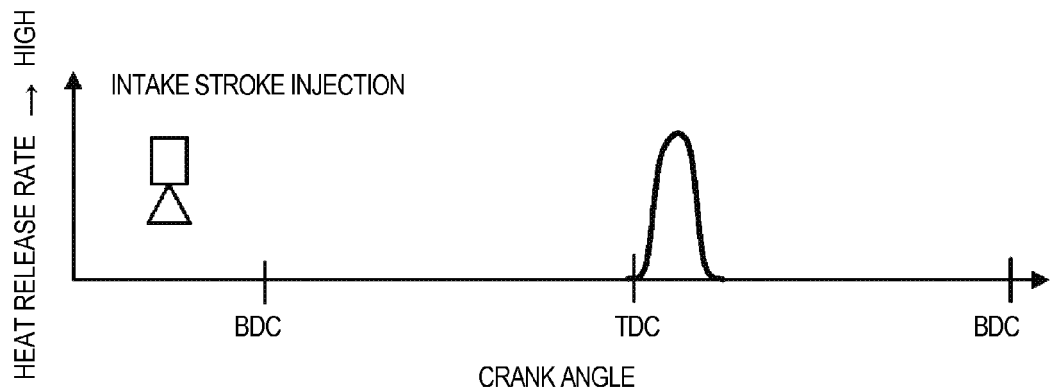
FIG. 7A illustrates one example of a fuel injection timing in a case where an intake stroke injection is performed in a CI mode and a heat release rate of CI combustion caused by the intake stroke injection.

The CI mode is divided into two ranges according to the level of the engine load. Specifically, within a range (1) corresponding to low and medium engine load ranges in the CI mode, hot EGR gas with a relatively high temperature is introduced into the cylinder 18 to improve ignitability and stability of the compression-ignition combustion. This, as described in detail later, is achieved by turning the VVL 71 on the exhaust side on and performing the exhaust open-twice control of opening the exhaust valve 22 during the intake stroke. The introduction of the hot EGR gas increases the compression-end temperature inside the cylinder 18, and is advantageous for improving the ignitability in the compression ignition and the combustion stability within the range (1). Moreover, within the range (1), as illustrated in FIG. 7A, the injector 67 injects the fuel into the cylinder 18 at least in a period from the intake stroke to a middle stage of the compression stroke, and thus homogeneous mixture gas is formed. The homogeneous mixture gas is compressed to self-ignite near the CTDC as illustrated in FIG. 7A.

Within a range (2) including the border for switching between the CI mode and the SI mode (i.e., switching load) and where the engine load is high in the CI mode, the temperature inside the cylinder 18 becomes high. Therefore, in order to suppress pre-ignition, an amount of the hot EGR gas is reduced while introducing cooled EGR gas, which is cooled by passing through the EGR cooler 52, into the cylinder 18.

Figure 7B:
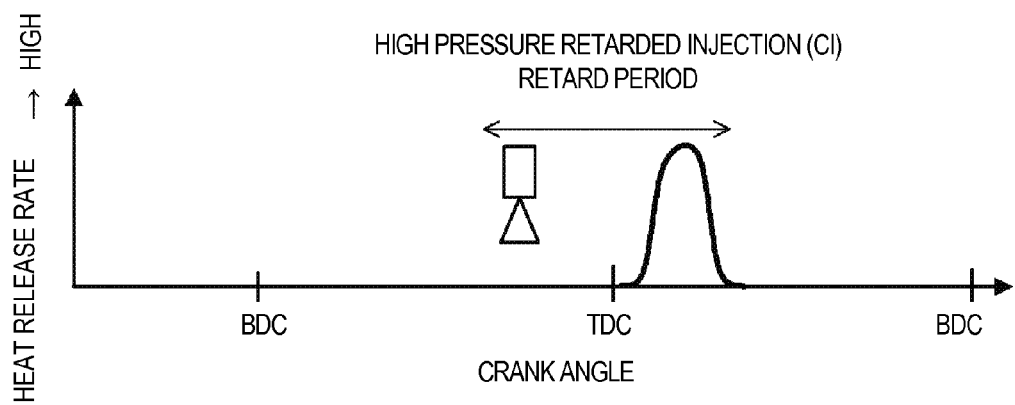
FIG. 7B illustrates one example of a fuel injection timing in a case where a high pressure retarded injection is performed in the CI mode and a heat release rate of the CI combustion caused by the high pressure retarded injection.

Moreover, with the engine 1, the range of the CI mode is extended further to the high engine load side as much as possible by setting the switching load as high as possible, and thus, if the fuel is injected into the cylinder 18 in a period from the intake stroke to the middle stage of the compression stroke within the range (2) where the engine load is high in the CI mode, it may cause abnormal combustion (e.g., pre-ignition). On the other hand, if a large amount of cooled EGR gas with a low temperature is introduced to decrease the compression-end temperature inside the cylinder 18, then the ignitability of the compression-ignition will degrade. In other words, within the range (2), the compression-ignition combustion cannot be performed stably only by controlling the in-cylinder temperature. Therefore, within the range (2), by adjusting the fuel injection mode in addition to the in-cylinder temperature control, the compression-ignition combustion can be stabilized while avoiding abnormal combustion (e.g., pre-ignition). Specifically, in this fuel injection mode, as illustrated in FIG. 7B, the fuel is injected into the cylinder 18 at least in a period from a late stage of the compression stroke to an early stage of expansion stroke (hereinafter, referred to as the retard period) at a significantly higher fuel pressure compared to the conventional mode. Hereinafter, this characteristic fuel injection mode is referred to as the "high pressure retarded injection" or simply "retarded injection." By the high pressure retarded injection, the compression-ignition combustion can be stabilized while avoiding the abnormal combustion within the range (2). The details of the high pressure retarded injection will be described later.

While the CI mode is as described above, in the SI mode, although it is not clearly illustrated in FIG. 6, the VVL 71 on the exhaust side is turned off to suspend the introduction of the hot EGR gas but the introduction of the cooled EGR gas continues. Moreover, in the SI mode, as described in detail later, an opening of the EGR valve 511 is adjusted while the throttle valve 36 is fully open, so as to adjust the amounts of fresh air and the external EGR gas introduced into the cylinder 18. The adjustment of the gas ratio introduced into the cylinder 18 as above can reduce a pumping loss, as well as it leads to avoiding abnormal combustion by introducing a large amount of the cooled EGR gas into the cylinder 18, and suppressing generation of raw $NO_x$ and reducing a cooling loss by suppressing the combustion temperature in the spark-ignition combustion low. Note that within a full engine load range, the EGR valve 511 is fully closed to cancel the external EGR.

The geometric compression ratio of the engine 1 is, as described above, set to 15:1 or higher (e.g., 18:1). Since a high compression ratio increases the compression-end temperature and a compression-end pressure inside the cylinder, it is advantageous for stabilizing the compression-ignition combustion in the CI mode, especially within the low engine load range of the CI mode [e.g., the range (1)]. Whereas, in the SI mode corresponding to the high engine load range, such a high compression ratio causes a problem in engine 1 that abnormal combustion (e.g., pre-ignition and knocking) easily occurs.

Thus, with the engine 1, the high pressure retarded injection is performed in the SI mode to avoid abnormal combustion. Specifically, the high pressure retarded injection in which the fuel is injected into the cylinder 18 at a high fuel pressure of 30 MPa or higher in the retard period from the late stage of the compression stroke to the early stage of the expansion stroke is performed. Note that in the SI mode, in addition to the high pressure retarded injection in the retard period, part of the fuel to be injected may be injected into the cylinder 18 in an intake stroke period in which the intake valve 21 is open (i.e., split injections may be performed).

Here, to briefly explain about the high pressure retarded injection in the SI mode, for example, as disclosed in detail in JP2011-038810 (JP2012-172665A) which was made by the applicant of the present invention, the high pressure retarded injection shortens a reactable time length of the mixture gas which is from the start of the fuel injection until the end of combustion, and thus aims to avoid abnormal combustion. The reactable time length in this case is a total time length of a period in which the injector 67 injects the fuel ((1) an injection period), a period from the end of the injection until combustible mixture gas is formed around the ignition plug 25 ((2) a mixture gas forming period), and a period from the start of the combustion started by the ignition until the combustion ends ((3) a combustion period), in other words, (1)+(2)+(3). The high pressure retarded injection shortens each of the injection period and the mixture gas forming period by injecting the fuel into the cylinder 18 at a high pressure. The shortening of the injection period and the mixture gas forming period enables retarding of the fuel injection timing, more specifically the injection start timing, to be comparatively late; therefore, in the high pressure retarded injection, the fuel is injected in the retard period from the late stage of the compression stroke to the early stage of the expansion stroke.

Due to the injection of the fuel into the cylinder 18 at a high fuel pressure, turbulence within the cylinder becomes stronger and the turbulence energy within the cylinder 18 increases. With the combination of this increase and setting the fuel injection timing to the comparatively late timing, the combustion by the spark ignition can be started while keeping the high turbulence energy. This shortens the combustion period.

Thus, the high pressure retarded injection shortens each of the injection period, the mixture gas forming period, and the combustion period, and as a result, can significantly shorten the reactable time length of unburned mixture gas compared to the conventional fuel injection during the intake stroke. As a result of the shortened reactable time length, the progression of the reaction of the unburned mixture gas when the combustion ends is suppressed, and abnormal combustion can be avoided.

Here, by setting the fuel pressure to, for example, 30 MPa or higher, the combustion period can effectively be shortened. Moreover, the fuel pressure of 30 MPa or higher can also effectively shorten the injection period and the mixture gas forming period. Note that the fuel pressure may suitably be set according to a type of fuel used which at least contains gasoline. The upper limit value of the fuel pressure may be 120 MPa, etc.

The high pressure retarded injection avoids the occurrence of abnormal combustion in the SI mode by adjusting the mode of the fuel injection into the cylinder 18. Alternatively to such high pressure retarded injection, a conventionally known method for avoiding abnormal combustion is by retarding the ignition timing. While the retarded ignition timing causes degradation of the thermal efficiency and reduction of the engine torque, in the case of performing the high pressure retarded injection, since abnormal combustion is avoided by adjusting the mode of the fuel injection, the ignition timing can be advanced, and thus, the thermal efficiency can be improved and the torque can be increased. In other words, the high pressure retarded injection can not only avoid abnormal combustion, but also enable advancing of the ignition timing accordingly, and thereby, is advantageous for improving fuel consumption.

As described above, the high pressure retarded injection in the SI mode can shorten each of the injection period, the mixture gas forming period, and the combustion period, while the high pressure retarded injection performed within the range (2) of the CI mode can shorten the injection period and the mixture gas forming period. In other words, by injecting the fuel at the high fuel pressure into the cylinder 18 to increase the turbulence inside the cylinder 18, the atomized fuel is more finely mixed, and even when the fuel injection is performed at the late timing near the CTDC, the comparatively homogeneous mixture gas can swiftly be formed.

With the high pressure retarded injection in the CI mode, by injecting the fuel at the late timing near the CTDC within the comparatively high engine load range, the substantially homogeneous mixture gas is swiftly formed as described above while preventing pre-ignition in, for example, a compression stroke period in which the fuel is not injected into the cylinder 18 in the first place. Therefore, after the CTDC, the compression-ignition can surely be performed. Further, by performing the compression-ignition combustion in an expansion stroke period in which the pressure inside the cylinder 18 gradually decreases due to motoring, the combustion subsides, and an excessive increase in the pressure ($dP/d\theta$) inside the cylinder 18 due to the compression-ignition combustion can be avoided. Thus, a restriction due to noise, vibration, and harshness (NVH) is lifted and, as a result, CI mode applicable range is extended further to the high load range side.

Figure 8:
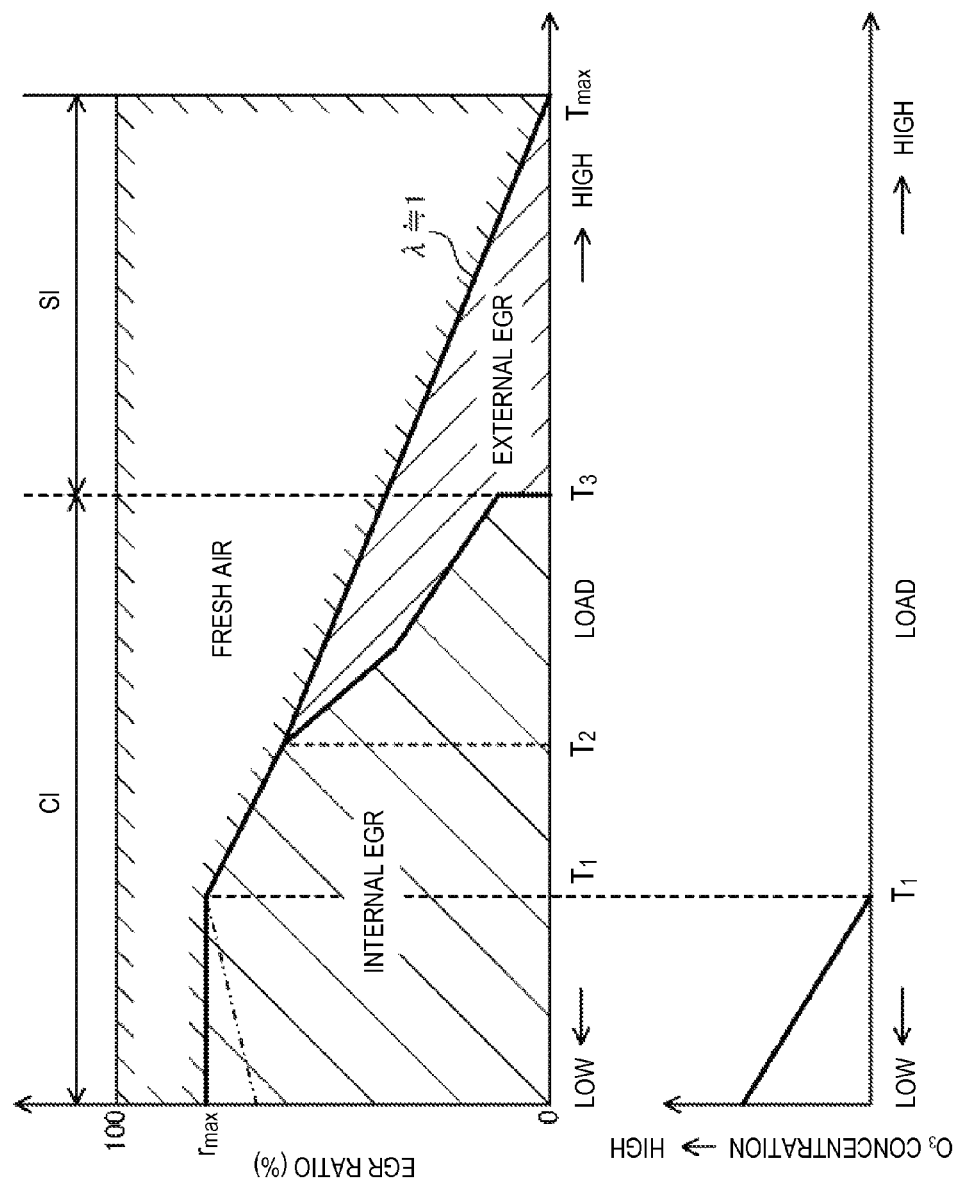
FIG. 8 shows charts illustrating a relationship of an EGR ratio with respect to an engine load and a relationship of an ozone concentration with respect to the engine load.

FIG. 8 illustrates a change in the EGR ratio with respect to the engine load (i.e., a change in gas composition within the cylinder 18). Hereinafter, the change in the EGR ratio is described in the order from the high engine load side to the low engine load side.

(From Highest Load $T_{max}$ to Switching Load $T_3$)

The range where the engine load is higher than the switching load $T_3$ corresponds to the SI mode. Within this SI range, as described above, only the cooled EGR gas is introduced into the cylinder 18. Specifically, the opening of the throttle valve 36 is kept fully open, and the EGR valve 511 is fully closed at a full engine load but gradually opens as the engine load decreases. Thus, in the SI mode, the EGR ratio is set to the maximum value under a condition in which the air-fuel ratio of the mixture gas is set to the theoretical air-fuel ratio ($\lambda \approx 1$). This is advantageous for reducing the pumping loss. Moreover, setting the air-fuel ratio of the mixture gas to the theoretical air-fuel ratio allows a three-way catalyst to be used. Since the fuel injection amount is reduced as the engine load decreases, the EGR ratio becomes higher continuously. This leads to continuously changing the gas composition within the cylinder 18 when the engine load continuously changes, and thus, it is advantageous for improving the controllability.

(From Switching Load $T_3$ to Specific Load $T_1$)

The switching load $T_3$ is related to the switching between the CI mode and the SI mode as described above, and the mode within the range where the engine load is lower than the switching load $T_3$ is the CI mode. The air-fuel ratio of the mixture gas is set to the theoretical air-fuel ratio ($\lambda \approx 1$) on both lower and higher engine load sides with respect to the switching load $T_3$ between the CI mode and the SI mode. Therefore, the EGR ratio increases continuously from the CI mode to the SI mode. In shifting between the CI mode and the SI mode where the combustion mode is switched, this does not cause any significant change other than switching between executing and not executing the spark ignition, and enables smoother switching between the CI mode and SI mode and suppression of the occurrence of torque shock and the like.

Moreover, within a range adjacent to the switching load $T_3$ on the low engine load side, continuously to the range adjacent to the switching load $T_3$ on the high engine load side, the compression-ignition combustion is performed by performing the high pressure retarded injection in which the fuel is injected at the high fuel pressure of 30 MPa or higher near the CTDC while introducing a comparatively large amount of EGR gas (cooled EGR gas) into the cylinder 18. This enables stable compression-ignition combustion to subside to lift the restriction of $dP/d\theta$, within a comparatively high engine load part of the range where the compression-ignition combustion is performed.

In the CI mode, the VVL 71 on the exhaust side is turned on to introduce the internal EGR gas (i.e., hot EGR gas) into the cylinder 18. Therefore, the on/off of the VVL 71 on the exhaust side is switched at the switching load $T_3$. The combined EGR ratio of the hot EGR gas and the cooled EGR gas becomes continuously higher as the engine load decreases. Moreover, the ratio between the cooled EGR gas and the hot EGR is changed such that the cooled EGR gas ratio becomes gradually lower and the hot EGR gas ratio becomes gradually higher as the engine load decreases. The introduction amount of the cooled EGR gas is adjusted by controlling the opening of the EGR valve 511. On the other hand, the introduction amount of the hot EGR gas is adjusted by controlling an overlapping amount of the open period of the intake valve 21 with respect to the open period of the exhaust valve 22 which opens in the intake stroke period. Specifically, the introduction amount of the hot EGR gas is adjusted by the combination of the adjustment of the open timing of the intake valve 21 and the close timing of the exhaust valve 22 by the VVT 72 on the intake side and the VVT 75 on the exhaust side, and the switch of the lift of the intake valve 21 between the large lift and the small lift.

Further, at a predetermined load $T_2$ between the switching load $T_3$ and a specific load $T_1$, the introduction of the cooled EGR gas is suspended, and when the engine load is lower than the predetermined load $T_2$, only the hot EGR gas is introduced into the cylinder 18. Thus, increasing the introduction amount of the hot EGR gas as the engine load becomes lower increases the gas temperature inside the cylinder before the compression stroke starts and thus increases the compression-end temperature. This is advantageous for improving the ignitability in the compression ignition within the range where the engine load is low, and for improving the stability of the compression-ignition combustion.

The EGR ratio which increases continuously as the engine load decreases is set to a highest EGR ratio $r_{max}$ at the specific load $T_1$.

(From Specific Load $T_1$ to Lowest Load)

To the specific load $T_1$, the EGR ratio is set continuously higher as the engine load decreases as described above; however, when the engine load is lower than the specific load $T_1$, regardless of the engine load, the EGR ratio is fixed to the highest EGR ratio $r_{max}$. Thus, the air-fuel ratio of the mixture gas is set lean.

Here, the EGR ratio is set to be lower than the highest EGR ratio $r_{max}$ because if the EGR ratio is increased and a large amount of exhaust gas is introduced into the cylinder 18, due to the specific heat ratio of gas within the cylinder 18 becoming low, the compression-end temperature becomes low even if the gas temperature before the compression stroke starts is high.

Figure 9:
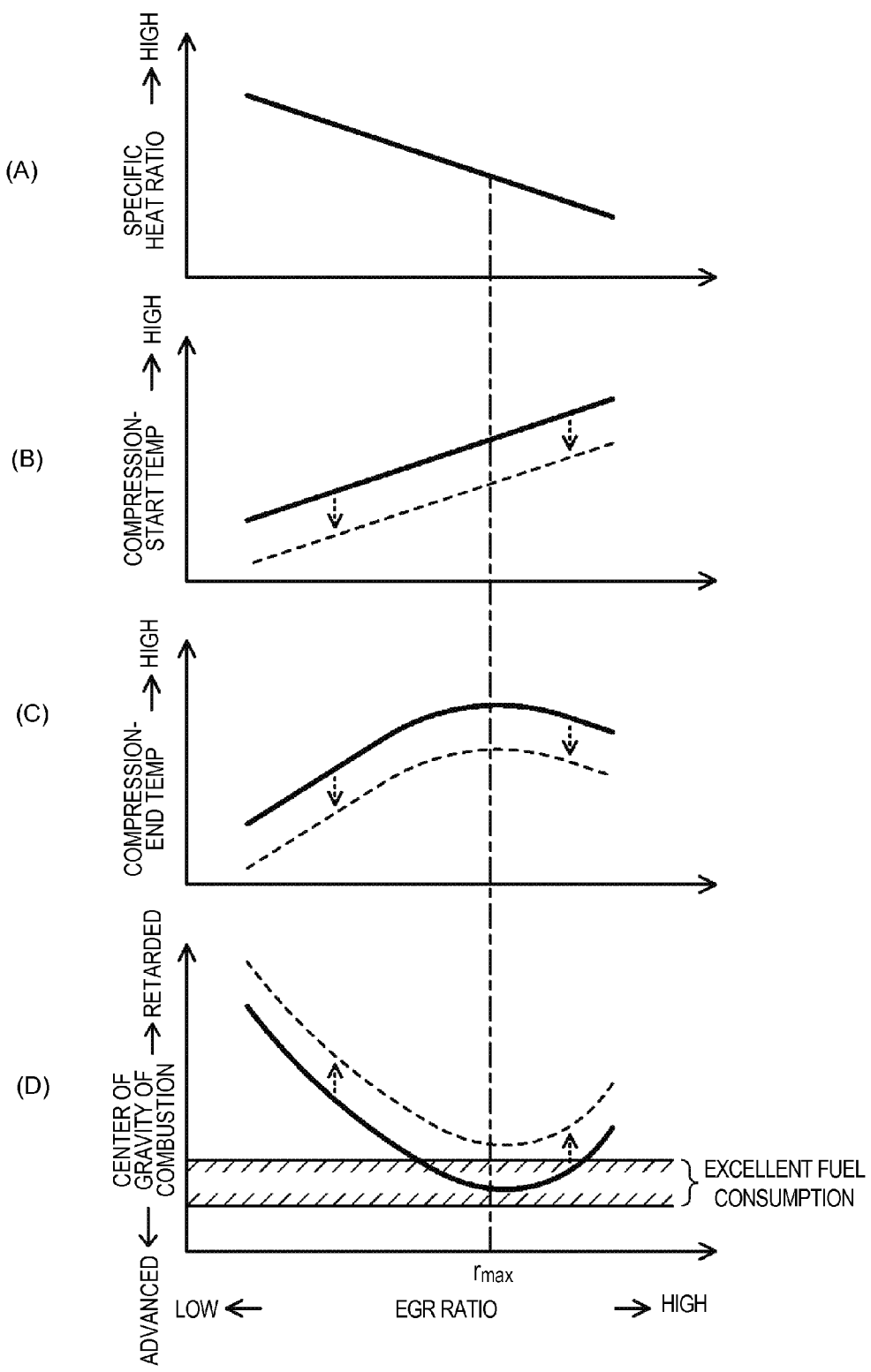
FIG. 9 shows charts, in which part (A) illustrates a relationship between a specific heat ratio of gas introduced into a cylinder and the EGR ratio, part (B) illustrates a relationship between the gas temperature inside the cylinder at the start of compression stroke and the EGR ratio, part (C) illustrates a relationship between a compression-end temperature and the EGR ratio, and part (D) illustrates a relationship between a position of the center of gravity of the combustion and the EGR ratio.

The description is given regarding this matter with reference to FIG. 9. Part (A) of FIG. 9 illustrates a relationship between the specific heat ratio of gas within the cylinder 18 and the EGR ratio. Exhaust gas generally contains a large amount of $CO_2$ and $H_2O$ which are triatomic molecules, and it has a high specific heat ratio compared to air containing nitrogen ($N_2$) and oxygen ($O_2$). Therefore, when the EGR ratio is increased and the exhaust gas introduced into the cylinder 18 is increased, the specific heat ratio within the cylinder 18 decreases.

Part (B) of FIG. 9 illustrates a relationship between the gas temperature inside the cylinder 18 before the compression stroke starts and the EGR ratio. The temperature of the exhaust gas is higher than that of fresh air, and therefore, the gas temperature before the compression stroke starts becomes higher as the EGR ratio becomes higher.

Part (C) of FIG. 9 illustrates a relationship between the compression-end temperature and the EGR ratio. As described above, although the gas temperature before the compression stroke starts becomes higher as the EGR ratio becomes higher, since the specific heat ratio of the gas becomes lower as the EGR ratio becomes higher as illustrated in part (A) of FIG. 9, the gas temperature does not increase much even after the compression stroke starts, and as a result, the compression-end temperature reaches its peak at the predetermined EGR ratio $r_{max}$, and even if the EGR ratio is increased to be higher than that, the compression-end temperature only becomes lower.

Part (D) of FIG. 9 illustrates a relationship between a position of the center of gravity of the combustion (i.e., a position of the center of gravity of the compression-ignition combustion) and the EGR ratio. As illustrated in part (C) of FIG. 9, the position of the center of gravity of the combustion is most advanced at the predetermined EGR ratio $r_{max}$ at which the compression-end temperature reaches its peak, and if the EGR ratio is increased to be higher than that, the position of the center of gravity of the combustion is gradually retarded. As a result, the position of the center of gravity of the combustion reaches a point outside of the range with excellent fuel consumption when the EGR ratio is increased excessively, as illustrated in part (D) of FIG. 9.

According to the above result, with the engine 1, the EGR ratio is set to the highest EGR ratio $r_{max}$ at which the compression-end temperature reaches its peak. Further, when the engine load is lower than the specific load $T_1$, the EGR ratio is set to the highest EGR ratio $r_{max}$ to avoid the decrease in the compression-end temperature. The highest EGR ratio $r_{max}$ may be set to between 50% and 90%. The highest EGR ratio $r_{max}$ may be set as high as possible within the extent that a high compression-end temperature can be secured, preferably between 70% and 90%. The geometric compression ratio of the engine 1 is set high as 15:1 or higher to secure a high compression-end temperature. Moreover, the exhaust open-twice control is adopted to introduce the exhaust gas with the temperature as high as possible, into the cylinder 18. Specifically, with the exhaust open-twice control, since the exhaust gas introduced into the cylinder 18 is discharged to the exhaust port once, as opposed to the configuration with the negative overlap period, the cooling loss caused by the compression of the exhaust gas is not increased, and also as opposed to the intake open-twice control of discharging the exhaust gas to the intake port where the temperature is relatively low, the decrease in the temperature of the exhaust gas can be suppressed. Therefore, the exhaust open-twice control can increase the gas temperature to its peak before the compression stroke starts. Thus, with the engine 1 configured to secure the highest possible compression-end temperature, the highest EGR ratio $r_{max}$ may be set, for example, about 80%. Setting the highest EGR ratio $r_{max}$ as high as possible is advantageous for reducing an unburned fuel loss of the engine 1. Specifically, since the unburned fuel loss easily becomes high when the engine load is low, setting the EGR ratio as high as possible when the engine load is lower than the specific load $T_1$ is extremely effective at improving the fuel consumption by reducing the unburned fuel loss.

Here, when the engine load is lower than the specific load $T_1$, although it is unnecessary when the ignitability in the compression ignition and the combustion stability can be secured by setting the EGR ratio to the highest EGR ratio $r_{max}$, if the ignitability in the compression ignition and the combustion stability degrade even when the EGR ratio is set to the highest EGR ratio $r_{max}$, the ozone generator 76 may be operated to apply ozone to the intake air to be introduced into the cylinder 18. The introduction of ozone into the cylinder 18 improves the ignitability of the mixture gas and improves the stability of the compression-ignition combustion. The ozone concentration may be set, as illustrated in the lower chart in FIG. 8, to increase continuously as the engine load decreases. By such a setting, a minimum required ozone concentration in securing the ignitability in the compression ignition and the combustion stability can be obtained, and a required power consumption in generating ozone can be minimized, which is advantageous for improving the fuel consumption. Note that a highest ozone concentration may be, for example, about 30 to 50 ppm. Moreover, the ozone concentration may be set to increase in a stepwise fashion as the engine load decreases. Furthermore, the ozone concentration may be fixed regardless of the engine load within the range where the engine load is lower than the specific load $T_1$. Moreover, instead of introducing ozone throughout the range where the engine load is lower than the specific load $T_1$, it may be such that ozone is introduced only within a low engine load part of the range lower than the specific load $T_1$.

Moreover, when the ambient temperature is low, since the temperature of fresh air introduced into the cylinder 18 decreases, as indicated by the dashed line in part (B) of FIG. 9, a compression-start temperature decreases and, thus, the compression-end temperature also decreases (see the dashed line in part (C) of FIG. 9). As a result, as indicated by the dashed line in part (D) of FIG. 9, the center of gravity of the combustion shifts to the retarding side. Thus, it may be such that the ozone generator 76 is not operated when the ambient temperature exceeds a predetermined temperature, while the ozone generator 76 is operated to introduce ozone into the cylinder 18 within the range where the engine load is lower than the specific load $T_1$ when the ambient temperature is lower than the predetermined temperature. Since the introduction of ozone improves the ignitability in the compression ignition and the combustion stability as described above, it advances the center of gravity of the combustion. In other words, even when the ambient temperature is low, the property indicated by the dashed line in part (D) of FIG. 9 can be changed to the property indicated by the solid line in part (D) of FIG. 9 by the ozone introduction. Thus, the ignitability in the compression ignition and the combustion stability tend to degrade when the ambient temperature is low particularly within the range where the engine load is lower than the specific load $T_1$, but they improve by the change in the property.

(Other Modes Regarding Ozone Introduction)

As described above, the exhaust open-twice control can keep the temperature of the exhaust gas introduced into the cylinder 18 at the highest temperature. On the other hand, the intake open-twice control discharges a part of the exhaust gas to the intake port once by opening the intake valve 21 on the exhaust stroke, and then introduces the exhaust gas into the cylinder 18 together with fresh air during the intake stroke. The temperature in the intake port is lower than the exhaust port, and the temperature of the exhaust gas may decrease while the exhaust gas is discharged to the intake port. Therefore, the gas temperature inside the cylinder 18 before the compression stroke starts decreases compared to the case of the exhaust open-twice control.

Moreover, by providing a so-called negative overlap period, the internal EGR gas can be introduced into the cylinder 18 (i.e., trapping the exhaust gas within the cylinder 18). However, with this configuration, the compression of the exhaust gas with a high temperature inside the cylinder 18 on the exhaust stroke increases the cooling loss, and as a result, the gas temperature inside the cylinder 18 before the compression stroke starts decreases compared to the case of the exhaust open-twice control.

As described above, with the engine configured to introduce the internal EGR gas by the intake open-twice control or setting the negative overlap period, the gas temperature before the compression stroke starts decreases and, as a result, particularly within the range where the engine load is lower than the specific load $T_1$, the compression-end temperature decreases and the ignitability in the compression ignition and the combustion stability degrade. As a result, with such an engine, the combustion mode within the range where the engine load is lower than the specific load $T_1$, needs to be the SI mode instead of the CI mode. However, also with such an engine, by introducing ozone into the cylinder 18 within the low engine load range, the ignitability in the compression ignition and the combustion stability can be secured. This enables the combustion mode to be set to the CI mode even within the range where the engine load is lower than the specific load $T_1$.

Moreover, with the engine of which the geometric compression ratio is comparatively low (e.g., 15:1 or lower, particularly between about 12:1 and 14:1), as a result of the compression-end temperature becoming low, the combustion mode needs to be the SI mode within the range where the engine load is lower than the specific load $T_1$ instead of the CI mode. However, similarly to the description above, also with such an engine, by introducing ozone into the cylinder 18 within the range where the engine load is lower than the specific load $T_1$, the ignitability in the compression ignition and the combustion stability can be secured. Therefore, the combustion mode can be set to the CI mode also within the range where the engine load is lower than the specific load $T_1$.

As described above, with the configuration of introducing ozone into the cylinder 18 when the engine load is lower than the specific load $T_1$, the ignitability in the compression ignition and the combustion stability are secured by the ozone introduction. Therefore, instead of fixing the EGR ratio to the highest EGR ratio $r_{max}$, the EGR ratio may be lowered from the highest EGR ratio $r_{max}$ as the engine load decreases, as indicated by the two-dot dashed line in FIG. 8.

Note that the application of the art disclosed herein is not limited to the engine configuration described above. For example, the fuel injection in the intake stroke period may be performed into the intake port 16 by a port injector separately provided in the intake port 16, instead of the injector 67 provided in the cylinder 18.

Moreover, regarding the valve train system of the engine 1, a CVVL (Continuously Variable Valve Lift) for continuously changing the lift may be provided instead of the VVL 74 of the intake valve 21. In this case, the VVT 75 on the exhaust side may be omitted.

Moreover, the engine 1 is not limited to the in-line four cylinder engine described above, and may be applied to an in-line three cylinder engine, an in-line two cylinder engine, an in-line six cylinder engine, etc. Further, the engine 1 is applicable to various kinds of engines, such as a V6 engine, a V8 engine, and a flat-four engine.

Further, in the description above, the air-fuel ratio of the mixture gas is set to the theoretical air-fuel ratio ($\lambda \approx 1$) within the predetermined operating range; however, the air-fuel ratio of the mixture gas may be set lean. Note that setting the air-fuel ratio to the theoretical air-fuel ratio has an advantage in that the three-way catalyst can be used.

The operation control map illustrated in FIG. 6 is merely an example, and other various maps may be provided.

Moreover, the high pressure retarded injection may be split injections as needed, and similarly, the intake stroke injection may also be split injections. In these split injections, the fuel may be injected on both the intake stroke and the compression stroke.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

1 Engine (Main Body of Engine)
10 PCM (Controller)
18 Cylinder
21 Intake Valve
22 Exhaust Valve
71 VVL (Internal EGR System, Exhaust Gas Circulation System)
76 Ozone Generator (Ozone Introducer)

What is claimed is:

1. A control device of a compression-ignition engine, comprising:
   an engine having a cylinder;
   an exhaust gas recirculation system for introducing exhaust gas into the cylinder; and
   a controller for operating the engine by compression-ignition combustion of mixture gas inside the cylinder when an operating state of the engine is within a predetermined compression-ignitable range on a low engine load side, wherein when the operating state of the engine is within the compression-ignitable range, the controller sets an EGR ratio higher as the engine load becomes lower, and the controller sets the EGR ratio to a predetermined highest EGR ratio when the engine load is at a specific load that is on the low engine load side within the compression-ignitable range, the EGR ratio being a ratio of the exhaust gas with respect to a total gas amount within the cylinder, and wherein when the engine load is lower than the specific load, the controller sets the EGR ratio to be lower than the highest EGR ratio.

2. The control device of claim 1, wherein the exhaust gas recirculation system includes an internal EGR system for recirculating the exhaust gas back into the cylinder by open-and-close controls of an intake valve and an exhaust valve of the engine, and wherein the internal EGR system adjusts the EGR ratio when the operating state of the engine is within the compression-ignitable range.

3. The control device of claim 2, wherein the internal EGR system introduces the exhaust gas discharged to the exhaust side on exhaust stroke, into the cylinder by opening the exhaust valve on intake stroke.

4. The control device of claim 1, wherein the highest EGR ratio is set to be between 50% and 90%.

5. The control device of claim 2, wherein the highest EGR ratio is set to be between 50% and 90%.

6. The control device of claim 3, wherein the highest EGR ratio is set to be between 50% and 90%.

7. The control device of claim 1, further comprising an ozone introducer for introducing ozone into the cylinder, wherein when the engine load is lower than the specific load, the controller introduces ozone into the cylinder by the ozone introducer.

8. The control device of claim 2, further comprising an ozone introducer for introducing ozone into the cylinder, wherein when the engine load is lower than the specific load, the controller introduces ozone into the cylinder by the ozone introducer.

9. The control device of claim 7, wherein the exhaust gas recirculation system includes an internal EGR system for recirculating the exhaust gas back into the cylinder by open-and-close controls of an intake valve and an exhaust valve of the engine, and wherein when the engine load is lower than the specific load, the controller sets the EGR ratio to be lower than the highest EGR ratio.

* * * * *